United States Patent

Tsutsumi

Patent Number: 6,113,135
Date of Patent: *Sep. 5, 2000

[54] SIDE IMPACT AIR BAG APPARATUS INCORPORATED INTO SEAT

[75] Inventor: Haruhiko Tsutsumi, Aichi-ken, Japan

[73] Assignee: Toyota Jidosha Kabushiki Kaisha, Toyota, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/781,053

[22] Filed: Jan. 9, 1997

[30] Foreign Application Priority Data

Jan. 10, 1996  [JP]  Japan ................................. 8-002110

[51] Int. Cl.⁷ .......................... B60R 21/18; B60R 21/22; B60R 22/26

[52] U.S. Cl. ................ 280/730.2; 280/808; 297/216.13; 297/483

[58] Field of Search .......................... 280/730.2, 730.1, 280/729, 728.1, 808; 297/216.13, 483

[56] References Cited

U.S. PATENT DOCUMENTS

| | | | |
|---|---|---|---|
| 4,348,037 | 9/1982 | Law et al. | 280/808 |
| 4,817,754 | 4/1989 | Muramoto | 280/808 |
| 4,946,191 | 8/1990 | Putsch | 280/730.2 |
| 5,112,079 | 5/1992 | Haland et al. | 280/730.2 |
| 5,123,673 | 6/1992 | Tame | 280/808 |
| 5,222,761 | 6/1993 | Kaji et al. | 280/730.2 |
| 5,251,931 | 10/1993 | Semchena et al. | 280/730.1 |
| 5,498,030 | 3/1996 | Hill et al. | 280/743.1 |
| 5,531,470 | 7/1996 | Townsend | 280/730.2 |
| 5,556,129 | 9/1996 | Coman et al. | 280/730.2 |
| 5,601,332 | 2/1997 | Schultz et al. | 280/730.2 |

FOREIGN PATENT DOCUMENTS

| | | |
|---|---|---|
| 4-050052 | 2/1992 | Japan . |
| 4-348712 | 12/1992 | Japan . |
| 5-139232 | 6/1993 | Japan . |
| 5-168544 | 7/1993 | Japan . |
| 5-294195 | 11/1993 | Japan . |
| 6-227348 | 8/1994 | Japan . |
| 7-215159 | 8/1995 | Japan . |
| 7-228213 | 8/1995 | Japan . |

*Primary Examiner*—Peter C. English
*Attorney, Agent, or Firm*—Pillsbury Madison & Sutro LLP

[57] ABSTRACT

A side impact air bag apparatus incorporated into a seat includes a column at a side portion of a seat back which opposes a door and which integrally moves with the seat back. The column accommodates an air bag main body which is folded within the column, and an inflator. A webbing guide device is disposed at a seat back shoulder portion of the seat near the inner side portion of the column in a transverse direction of the vehicle. The webbing guide device guides a webbing, one end of which is fixed to an anchor at a center pillar.

6 Claims, 3 Drawing Sheets

SIDE IMPACT AIR BAG APPARATUS INCORPORATED INTO SEAT

BACKGROUND OF THE INVENTION

1. Field of the Invention

The present invention relates to a side impact air bag apparatus incorporated into a seat, and more particularly to a side impact air bag apparatus incorporated into a seat which includes a side impact air bag at the side portion of a seat back.

2. Description of the Related Art

Conventionally, structures disclosed in JP-A No. 7-215159 and JP-A No. 7-228213 are known as an example of a side impact air bag apparatus incorporated into a seat which includes a side impact air bag at the side portion of a seat back. Further, JP-A No. 6-227348 discloses a side air bag apparatus in which a chest portion air bag and a head portion air bag are accommodated, in which both of the air bags communicate with a door trim, and in which the chest portion air bag unfolds at first. JP-A No. 5-294195 discloses an air bag apparatus in which a side air bag accommodated within a door trim forms a shape in which an area which interferes with a seat belt is cut out. JP-A No. 5-139232 discloses a side air bag apparatus in which an air bag is at least divided into an upper portion and a lower portion and unfolds so that a space having a predetermined height is formed along an upper portion of a belt line of a vehicle.

In these side impact air bag apparatuses, an air bag apparatus is mounted in the side portion of a seat back or the side portion of a seat cushion. When an external force is applied to the side of the vehicle, an air bag main body accommodated within the air bag apparatus unfolds due to the gas injected from an inflator accommodated within the air bag apparatus. The air bag main body unfolds toward the side portions of the chest and head of an occupant seated in the seat so as to protect his/her chest and head from the impact.

However, these side impact air bag apparatuses are affected by the front-and-back slide position of the seat and the inclined angle of the seat back. Especially, when the seat is at its rearmost position and the seat back is inclined in a rearward direction, a webbing which extends from an anchor of a seat belt apparatus provided at the upper portion of a center pillar may interfere with the unfolding air bag main body.

SUMMARY OF THE INVENTION

With the aforementioned in view, an object of the present invention is to obtain a side impact air bag apparatus incorporated into a seat which can prevent interference between a webbing and an air bag main body.

A first aspect of the present invention is a side impact air bag apparatus incorporated into a seat, comprising: a column which is provided at a side portion of a seat back which opposes a door and which integrally moves with the seat back, the column accommodating an air bag main body, which has been folded within the column, and an inflator; and webbing guide means provided at a seat back shoulder portion which is positioned in a vicinity of a vehicle transverse direction inner side portion of the column, the webbing guide means guiding a webbing, one end of which is fixed to an anchor provided at a center pillar.

Accordingly, when the external force is applied to the side of the vehicle, the air bag main body unfolds from the column to the front of the vehicle so as to protect the side portion of the occupant. Moreover, the constant path is maintained by the webbing guide means so that the webbing passes through behind the column. Further, the present invention achieves a superior effect in that the interference between the webbing and the air bag main body can be prevented.

A second aspect of the present invention is a side impact air bag apparatus incorporated into a seat according to the first aspect of the present invention, wherein the column is provided such that the height of the column is substantially the same as the height of a headrest when viewed from a transverse direction of a vehicle, and the size of the air bag main body is set such that an occupant's head and chest can be simultaneously protected.

Consequently, when the external force is applied to the side of the vehicle, the air bag main body unfolds and simultaneously protects the occupant's chest and head. Moreover, in a state in which the occupant places his/her arm on the open portion of the door, the air bag main body unfolds while pressing and moving the arm in the forward direction.

A third aspect of the present invention is a side impact air bag apparatus incorporated into a seat, comprising: a column which is provided at a side portion of a seat back which opposes a door and which integrally moves with the seat back, the column having a chest portion air bag main body accommodating portion and a head portion air bag main body accommodating portion, the chest portion air bag main body accommodating portion accommodating a folded chest portion air bag main body and an inflator, the head portion air bag main body accommodating portion accommodating a folded head portion air bag main body and an inflator; and a webbing guide portion provided between the chest portion air bag main body accommodating portion and the head portion air bag main body accommodating portion, the webbing guide portion guiding a webbing, one end of which is fixed to an anchor provided at a lower portion of a center pillar.

Accordingly, when the external force is applied to the side of the vehicle, the chest portion air bag main body unfolds from the chest portion air bag main body accommodating portion of the column to the front of the vehicle so that the side portion of the chest of the occupant is protected. Further, the head portion air bag main body unfolds from the head portion air bag main body accommodating portion of the column to the front of the vehicle so that the side portion of the head of the occupant is protected. Further, the constant path is maintained by the webbing guide portion such that the webbing passes through the position between the chest portion air bag main body accommodating portion of the column and the head portion air bag main body accommodating portion thereof. Moreover, the present invention achieves a superior effect in that the interference between the webbing and the air bag main body can be prevented. A superior effect is also achieved in that the chest portion air bag main body and the head portion air bag main body can be unfolded independently at an optimal timing.

A fourth aspect of the present invention is a side impact air bag apparatus incorporated into a seat, comprising: a column which is provided at a side portion of a seat back which opposes a door and which integrally moves with the seat back, the column accommodating an air bag main body, which has been folded within the column, and an inflator; and webbing drive means which is accommodated within one of a left shoulder portion of the seat back and a right shoulder portion of the seat back, the seat back being positioned at an inner side in a transverse direction of a vehicle with respect to the column.

Therefore, even if the accommodating position of the webbing drive means is set to either the left shoulder portion of the seat back or the right shoulder portion thereof, the air bag main body and the webbing do not interfere with each other.

DESCRIPTION OF THE PREFERRED EMBODIMENTS

A side impact air bag apparatus incorporated into a seat relating to a first embodiment of the present invention will be described in accordance with FIG. 1.

In all of the drawings, arrow FR denotes a forward direction of a vehicle; arrow UP indicates an upward direction of the vehicle; and arrow IN denotes an inward direction of the vehicle in the transverse direction thereof.

Figure 1:
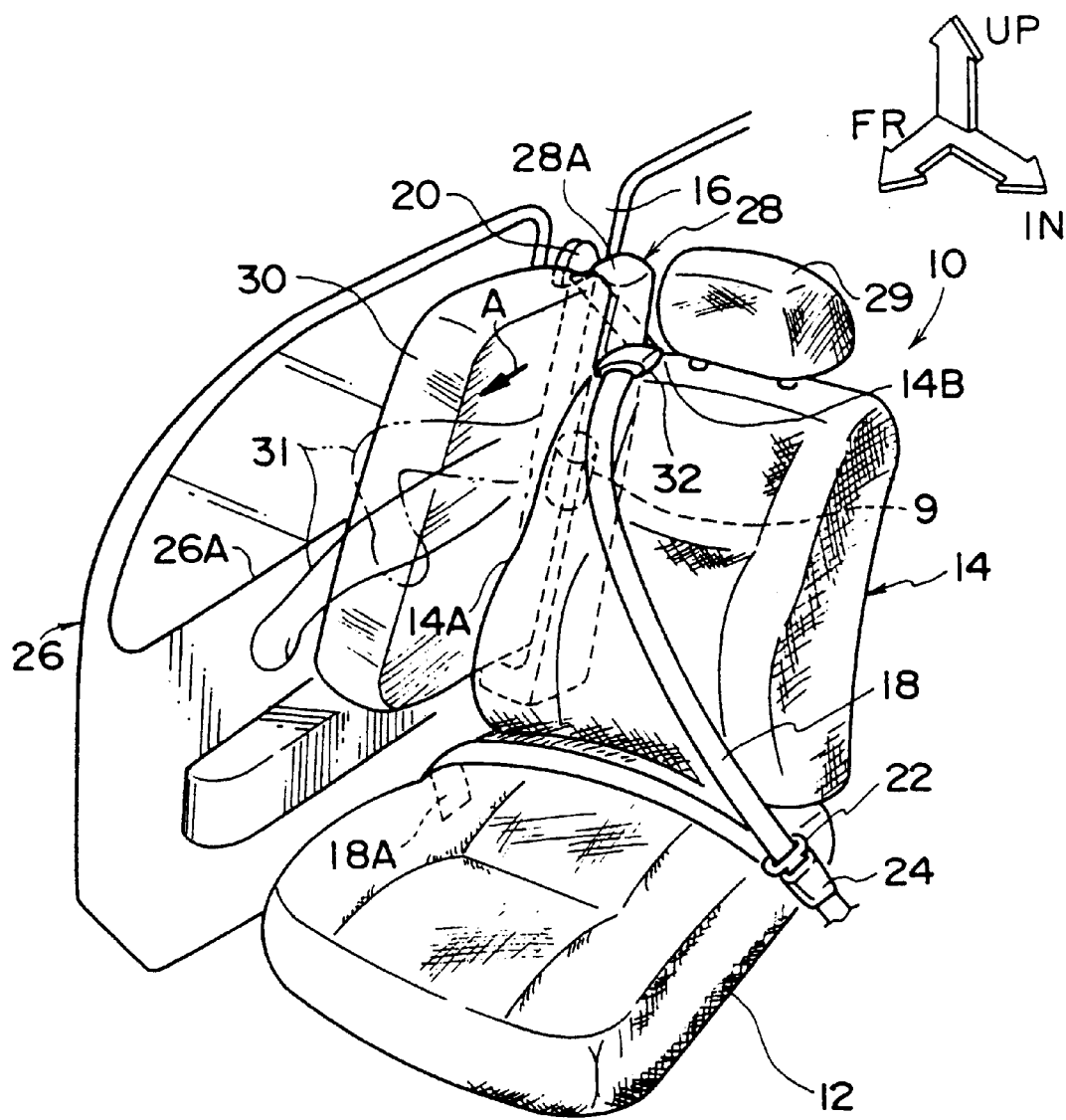
FIG. 1 is a perspective view which, seen from the inner side forward direction of a vehicle, shows a side impact air bag apparatus incorporated into a seat relating to a first embodiment of the present invention.

As illustrated in FIG. 1, in the side impact air bag apparatus incorporated into the seat of the first embodiment, a front seat 10 is movable in the longitudinal direction of the vehicle by a slide mechanism (not illustrated) which is disposed beneath a seat cushion 12. Further, the inclined angle of a seat back 14 in the longitudinal direction of the vehicle can be changed by a rotating mechanism which is provided at a portion connecting the seat back 14 and the seat cushion 12.

A webbing retractor (not illustrated) is disposed beneath a center pillar 16. A webbing 18 which has been taken up onto the webbing retractor passes through a through ring 20 attached to the upper portion of the center pillar 16, and an end portion 18A is moored to an anchor or the like in a vicinity of the lower end of the center pillar 16. A tongue plate 22 is provided for insertion between the through ring 20 and the above-described moored point. By engaging the tongue plate 22 with a buckle 24 which is disposed at a central side of a floor (not illustrated) across the front seat 10, the webbing 18 can be attached to a front surface of an occupant (not illustrated) seated in the front seat 10.

A column 28 is provided at a side portion 14A, which opposes a side door 26, of the seat back 14 so that the column 28 is integrally movable with the seat back 14. The height of an upper end portion 28A of the column 28 is the same as that of a headrest 29, when viewed from the side. The column 28 is fixed to a frame of the seat back 14 and moves together with the seat back 14.

An air bag main body 30 is accommodated within the column 28 in a folded state. An inflator 9 for inflating and unfolding the air bag main body 30 is also accommodated within the column 28. A lid is provided at a front portion of the column 28. At the time of unfolding of the air bag main body 30, the lid is opened due to the inflating force of the air bag main body 30 such that the air bag main body 30 unfolds between the side door 26 and the occupant.

The size of the air bag main body 30 is set so that the occupant's chest and head can be simultaneously protected. In a state in which the occupant places an arm 31 on an open portion 26A of the side door 26 (the state shown by an imaginary line in FIG. 1), the air bag main body 30 is unfolded while pressing and moving the arm 31 in the forward direction (the direction of arrow A in FIG. 1).

A shoulder guide 32 serving as webbing guide means is provided at an outer side shoulder portion 14B in the transverse direction of the vehicle (hereinafter, "outer side shoulder portion 14B") of the seat back 14, which is provided at the inner side of the vehicle with respect to the column 28 and is near the column 28. The webbing 18 passes through the shoulder guide 32.

Next, the operation of the first embodiment will be explained.

In the side impact air bag apparatus incorporated into the seat of the first embodiment, when the external force is applied to the side of the vehicle so as to operate the inflator 9 within the column 28, the air bag main body 30 is inflated and unfolded due to the gas injected from the inflator 9. At this time, due to the inflating force of the air bag main body 30, the air bag main body 30 presses and opens the lid provided at the front portion of the column 28. The air bag main body 30 unfolds in the forward direction (the direction of arrow A in FIG. 1) of the vehicle and unfolds between the side door 26 and the occupant's chest and head so as to protect the side portions of his/her chest and head. Additionally, since the webbing 18 passes through the shoulder guide 32 provided at the outer side shoulder portion 14B of the seat back 14, which is near the inner side of the vehicle with respect to the column 28, the path of the webbing 18 is maintained at a position through which the webbing 18 passes behind the column 28.

Therefore, regardless of the front-and-back position of the seat 10 and the inclined angle of the seat back 14, the position at which the air bag main body 30 is located when in an unfolded state can be set so that that position and the position at which the occupant is seated in the seat 10 are in a fixed relationship. Further, because the webbing 18 passes through behind the column 28, the interference between the webbing 18 and the air bag main body 30 can be always prevented, and the air bag main body 30 can be smoothly unfolded.

Moreover, in the side impact air bag apparatus incorporated into the seat of the first embodiment, the size of the air bag main body 30 is set so that the occupant's chest and head can be simultaneously protected. Accordingly, when the external force is applied to the side of the vehicle, the air bag main body 30 unfolds such that the occupant's chest and head can be simultaneously protected. Further, in a state in which the occupant places his arm 31 on the open portion of the side door 26 (the state shown by an imaginary line in FIG. 1), the air bag main body 30 can unfold while pressing and moving the arm 31 in the forward direction (the direction of arrow A in FIG. 1).

Next, a side impact air bag apparatus incorporated into a seat relating to a second embodiment of the present invention will be explained in accordance with FIG. 2.

Members which are the same as those in the first embodiment are denoted by the same reference numerals, and descriptions thereof are omitted.

Figure 2:
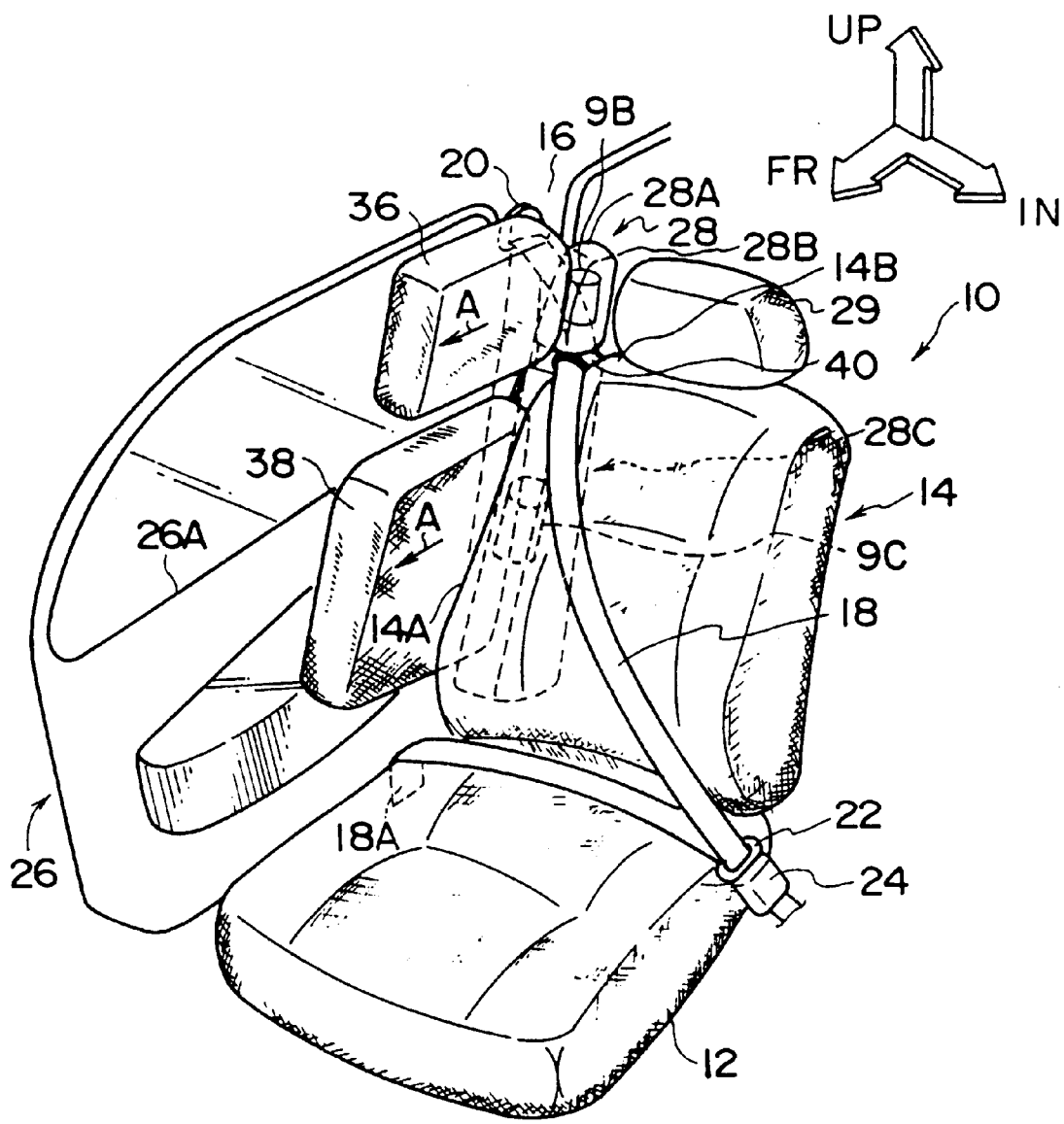
FIG. 2 is a perspective view which, seen from the inner side forward direction of a vehicle, shows a side impact air bag apparatus incorporated into a seat relating to a second embodiment of the present invention.

As illustrated in FIG. 2, in the side impact air bag apparatus incorporated into the seat of the second embodiment, the upper portion of the column 28 is a head portion air bag main body accommodating portion 28B. A head portion air bag main body 36 is accommodated in a folded state within the head portion air bag main body accommodating portion 28B. Additionally, an inflator 9B for inflating and unfolding the head portion air bag main body 36 is accommodated within the head portion air bag main body accommodating portion 28B. A lid is provided at the front portion of the head portion air bag main body accommodating portion 28B. At the time of unfolding of the air bag main body, the lid is opened due to the inflating force of the head portion air bag main body 36 so that the head portion air bag main body 36 unfolds between the side door 26 and the occupant's head.

The lower portion of the column 28 is a chest portion air bag main body accommodating portion 28C. A chest portion air bag main body 38 is accommodated in a folded state within the chest portion air bag main body accommodating portion 28C. Additionally, an inflator 9C for inflating and unfolding the chest portion air bag main body 38 is accommodated within the chest portion air bag main body accommodating portion 28C. A lid is provided at the front portion of the chest portion air bag main body accommodating portion 28C. At the time of unfolding of the air bag main body, the lid is opened due to the inflating force of the chest portion air bag main body 38 so that the chest portion air bag main body 38 unfolds between the side door 26 and the occupant's chest.

A shoulder guide portion 40 serving as a webbing guide portion is formed at the position between the head portion air bag main body accommodating portion 28B of the column 28 and the chest portion air bag main body accommodating portion 28C thereof. The webbing 18 passes through the shoulder guide portion 40.

Next, the operation of the second embodiment will be explained.

In the side impact air bag apparatus incorporated into the seat of the second embodiment, when the external force is applied to the side of the vehicle so as to operate the inflator 9B within the head portion air bag main body accommodating portion 28B of the column 28, the head portion air bag main body 36 is inflated and unfolded due to the gas injected from the inflator 9B. At this time, due to the inflating force of the head portion air bag main body 36, the head portion air bag main body 36 presses and opens the lid provided at the front portion of the head portion air bag main body accommodating portion 28B. The head portion air bag main body 36 unfolds in the forward direction (the direction of arrow A in FIG. 2) of the vehicle, and unfolds between the side door 26 and the occupant's head so as to protect the side portion of his/her head.

When the external force is applied to the side of the vehicle so as to operate the inflator 9C within the chest portion air bag main body accommodating portion 28C of the column 28, the chest portion air bag main body 38 is inflated and unfolded due to the gas injected from the inflator 9C. At this time, due to the inflating force of the chest portion air bag main body 38, the chest portion air bag main body 38 presses and opens the lid provided at the front portion of the chest portion air bag main body accommodating portion 28C. The chest portion air bag main body 38 unfolds in the forward direction (the direction of arrow A in FIG. 2) of the vehicle, and unfolds between the side door 26 and the occupant's chest so as to protect the side portion of his/her chest.

Additionally, the webbing 18 passes through the shoulder guide portion 40 which is provided at the position between the head portion air bag main body accommodating portion 28B of the column 28 and the chest portion air bag main body accommodating portion 28C thereof.

Therefore, regardless of the front-and-back position of the seat 10 and the inclined angle of the seat back 12, the positions at which the chest portion air bag main body 38 and the head portion air bag main body 36 are located when in unfolded states can be set so that those positions and the position at which the occupant is seated in the seat 10 are in a fixed relationship. Further, because the webbing 18 passes through the shoulder guide portion 40 which is provided at a position between the head portion air bag main body accommodating portion 28B of the column 28 and the chest portion air bag main body accommodating portion 28C thereof, the interference between the webbing 18 and the chest portion air bag main body 38/head portion air bag main body 36 can be always prevented, and the chest portion air bag main body 38 and the head portion air bag main body 36 can be smoothly unfolded.

Further, in the side impact air bag apparatus incorporated into the seat of the second embodiment, the chest portion air bag main body 38 and the head portion air bag main body 36 can be independently unfolded at an appropriate timing.

Next, the side impact air bag apparatus incorporated into the seat relating to the third embodiment of the present invention will be explained in accordance with FIG. 3.

Members which are the same as those of the first embodiment are denoted by the same reference numerals, and the descriptions thereof are omitted.

Figure 3:
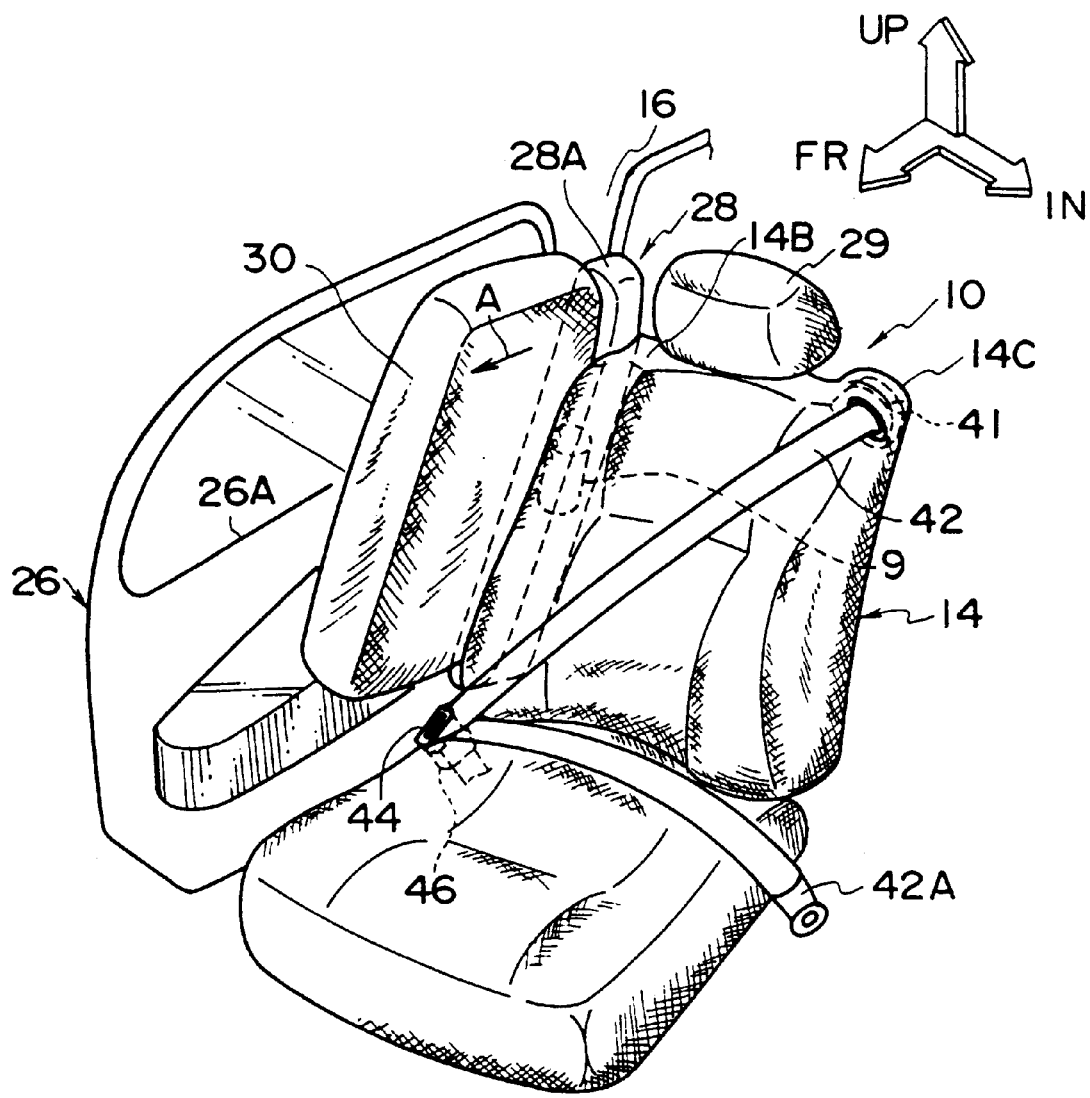
FIG. 3 is a perspective view which, seen from the inner side forward direction of a vehicle, shows a side impact air bag apparatus incorporated into a seat relating to a third embodiment of the present invention.

As illustrated in FIG. 3, in the side impact air bag apparatus incorporated into the seat of the third embodiment, a webbing retractor 41 serving as webbing drive means is accommodated within an inner side shoulder portion 14C in the transverse direction of the vehicle (hereinafter, "inner side shoulder portion 14C") of the seat back 14, which is positioned at the inner side of the vehicle with respect to the column 28. An end portion 42A of the webbing 42, which has been taken up onto the webbing retractor 41, is moored to an anchor or the like at the central side of a floor (not illustrated).

A tongue plate 44 is provided for insertion between the retractor 41 of the webbing 42 and the above-described moored point. By engaging the tongue plate 44 with a buckle 46 which is disposed at a portion of the floor (not illustrated) at the transverse direction outer side of the front seat 10, the webbing 42 can be mounted to the front surface of the occupant (not illustrated) seated in the front seat 10.

Next, the operation of the third embodiment will be explained.

In the side impact air bag apparatus incorporated into the seat of the third embodiment, when the external force is applied to the side of the vehicle so as to operate the inflator 9 within the column 28, the air bag main body 30 is inflated and unfolded due to the gas injected from the inflator 9. At this time, due to the inflating force of the air bag main body 30, the air bag main body 30 presses and opens the lid provided at the front portion of the column 28. The air bag main body 30 unfolds in the forward direction (the direction of arrow A in FIG. 3) of the vehicle, and unfolds between the side door 26 and the occupant's chest and head so as to protect the side portions of his/her chest and head. Additionally, the webbing 42 is taken up onto the webbing retractor 41 accommodated within the inner side shoulder portion 14C of the seat back 14, which is positioned at the inner side of the vehicle with respect to the column 28.

Therefore, regardless of the front-and-back position of the seat 10 and the inclined angle of the seat back 14, the position at which the air bag main body 30 is located when in an unfolded state can be set so that that position and the position at which the occupant is seated in the seat 10 are in a fixed relationship. Further, because the webbing 42 is taken up onto the webbing retractor 41 accommodated within the inner side shoulder portion 14C of the seat back 14 which is positioned at the inner side of the vehicle with respect to the column 28, the interference between the webbing 42 and the air bag main body 30 can be always prevented, and the air bag main body 30 can be smoothly unfolded.

Further, in the side impact air bag apparatus incorporated into the seat of the third embodiment, the webbing retractor 41 can be accommodated within the outer side shoulder portion 14B of the seat back 14 which is positioned at the inner side of the vehicle with respect to the column 28. As a result, even if the accommodating position of the webbing retractor 41 is set to either the left shoulder portion of the seat back 14 or the right shoulder portion thereof, the interference between the air bag main body 30 and the webbing 42 can be avoided.

While the present invention has been described in detail in its specific embodiments, it is obvious to those skilled in the art that the present invention is not limited thereto and that various other embodiments are possible within the scope of the present invention. For example, the column 28 may be a separate product from the seat back 14. In this case, the conventional seat back need not be greatly modified, and the column 28 may be mounted on the seat back 14. Moreover, a material which is different from that of the seat back 14 can be used for the column 28.

What is claimed is:

1. A side impact air bag apparatus comprising:

a column at a side portion of a seat back, the column opposing a door and being integrally movable with the seat back, said column accommodating a folded air bag main body within said column and an inflator for inflating the air bag main body; and webbing guide means, disposed on a seat back shoulder portion at a vehicle transverse direction inner side portion of said column, for guiding a webbing having one end anchored at a center pillar, so that said webbing passes behind said column;

wherein a top of the column is positioned higher than the webbing guide means; and the webbing guide means is disposed at the seat back shoulder portion near the column so that the webbing passes behind the column.

2. A side impact air bag apparatus according to claim 1, wherein:

the height of said column is substantially the same as the height of a headrest when viewed from a vehicle transverse direction; and the size of said air bag main body is such that an occupant's head and chest can be simultaneously protected.

3. A side impact air bag apparatus according to claim 1, wherein said webbing guide means is further for guiding the webbing by passing the webbing through said webbing guide means.

4. A side impact air bag apparatus comprising:

a column at a side portion of a seat back, the column opposing a door and being integrally movable with the seat back, said column having a chest portion air bag accommodating portion and a head portion air bag accommodating portion, said chest portion air bag accommodating portion accommodating a folded chest portion air bag and an inflator, said head portion air bag accommodating portion accommodating a folded head portion air bag and an inflator; and a webbing guide portion, between said chest portion air bag accommodating portion and said head portion air bag accommodating portion, for guiding a webbing having one end fixed to an anchor provided at a lower portion of a center pillar.

5. A side impact air bag apparatus according to claim 4, wherein said webbing guide portion is further for guiding the webbing by passing the webbing through said webbing guide portion.

6. A side impact air bag apparatus according to claim 4, wherein a top of said column is higher than said webbing guide portion in a direction of said seat back.

* * * * *